US007324738B2

(12) United States Patent
Sugimoto

(10) Patent No.: US 7,324,738 B2
(45) Date of Patent: Jan. 29, 2008

(54) VIDEO STREAM PROCESSING APPARATUS AND VIDEO STREAM PROCESSING METHOD

(75) Inventor: Koji Sugimoto, Nagoya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 720 days.

(21) Appl. No.: 10/932,082

(22) Filed: Sep. 2, 2004

(65) Prior Publication Data
US 2005/0053159 A1 Mar. 10, 2005

(30) Foreign Application Priority Data
Sep. 5, 2003 (JP) ............................. 2003-314735

(51) Int. Cl.
*H04N 5/00* (2006.01)
(52) U.S. Cl. ....................................................... 386/95
(58) Field of Classification Search ................... 386/46, 386/81, 95
See application file for complete search history.

(56) References Cited
U.S. PATENT DOCUMENTS
5,377,051 A * 12/1994 Lane et al. ................... 386/81

6,694,092 B1 * 2/2004 Hayashi ....................... 386/124

FOREIGN PATENT DOCUMENTS
JP        2000-132949        5/2000

* cited by examiner

*Primary Examiner*—Thai Q. Tran
*Assistant Examiner*—Mishawn Dunn
(74) *Attorney, Agent, or Firm*—Wenderoth, Lind & Ponack, L.L.P.

(57) ABSTRACT

An image-quality control information adding section 13 reads image-quality control information corresponding to a type of an input video stream 101 from an image-quality control information storage section 12, and then adds the read image-quality control information to the video stream 101. A recording section 43 records a video stream 104 with the image-quality control information added thereto. An image-quality control information extracting section 22 extracts a video profile 202 from the video stream 201 read from the recording section 43. Based on the video stream after the video profile 202 is extracted, a decoding section 23 obtains a video signal 205. An image quality adjusting section 24 adjusts the characteristic of the video signal 205 based on the video profile 202, and then outputs the adjustment results as a video signal 206 after image quality adjustment.

17 Claims, 12 Drawing Sheets

FIG. 2

| PROFILE NUMBER | VIDEO TYPE | TAG INFORMATION | VIDEO CONTROL PARAMETERS ||||| AUDIO CONTROL PARAMETERS ||||| CONTROL DATA |
|---|---|---|---|---|---|---|---|---|---|---|---|---|---|
| | | | GAMMA VALUE | MAXIMUM LUMINANCE | CONTRAST | COLOR CONVERSION | VOLUME | SOUND | BASS | 5.1 CH | EQUALIZER | LANGUAGE DESCRIPTION |
| PROFILE 1 | MOVIE | "MOVIE" | 1.05 | 200 | 200 | CT1 | 80% | HIGH | HIGH | ON | EQ1 | LD1 |
| PROFILE 2 | ANIMATION | "ANIMATION" | 1.10 | 400 | 900 | CT2 | 70% | MID | MID | OFF | EQ2 | LD2 |
| PROFILE 3 | GRAPHICS | "GRAPHICS" | 1.00 | 350 | 800 | CT3 | 90% | HIGH | MID | ON | EQ3 | LD3 |
| PROFILE 4 | DRAMA | "DRAMA1" | 1.02 | 200 | 600 | CT4 | 80% | HIGH | LOW | ON | EQ4 | LD4 |
| PROFILE 5 | DRAMA | "DRAMA2" | 0.95 | 250 | 800 | CT5 | 90% | MID | LOW | ON | EQ5 | LD5 |
| PROFILE 6 | SPORTS | "SPORTS" | 1.12 | 300 | 300 | CT6 | 100% | MID | MID | ON | EQ6 | LD6 |
| PROFILE 7 | TELETEXT | "TELETEXT" | 1.20 | 400 | 600 | CT7 | 30% | OFF | OFF | OFF | EQ7 | LD7 |
| PROFILE 8 | USER DEFINITION | "FAVORITE 1" | 0.80 | 350 | 300 | CT8 | 70% | MID | HIGH | ON | EQ8 | LD8 |
| PROFILE 9 | JAZZ | "JAZZ" | 0.95 | 150 | 300 | CT9 | 100% | HIGH | HIGH | ON | EQ9 | LD9 |
| ... | | | | | | | | | | | | |

HEADER (4 BYTES)

adaptation_filed_control=1*    transport_private_data_flag=1

PES_extension_flag=1    PES_private_data_flag=1

VIDEO STREAM PROCESSING APPARATUS AND VIDEO STREAM PROCESSING METHOD

BACKGROUND OF THE INVENTION

1. Field of the Invention

The present invention relates to video stream processing apparatuses and video stream processing methods and, more specifically, to a video stream processing apparatus and a video stream processing method for performing a predetermined process on an encoded video stream.

2. Description of the Background Art

In recent years, with the proliferation of video equipment, a person often owns several pieces of video equipment, such as a television receiver, a tuner, a video recorder, and a DVD recorder. Also, with broadcast becoming more multi-channeled, types of videos to be played and recorded by the video equipment have been increased. For example, as for a television receiver, many types of programs, such as movie, sports, drama, and animation, can be displayed on a screen. In order to display many types of programs consistently with high quality, the image quality has to be controlled for each program. Particularly, in order to control the image quality according to the user's preferences, each user has to adjust the image quality manually by using an image-quality controlling function provided to the video equipment. Regarding such image quality control over the video equipment, a scheme disclosed in Japanese Patent Laid-Open Publication No. 2000-132949 is exemplarily known.

However, it is not often the case that the user controls the image quality manually by using the image-quality control function of the video equipment. With each type of video equipment achieving different levels of image quality and each type of displayed video having different preferable settings, most users feel it burdensome to manually control the image quality according to the type of the video equipment and the type of video. Therefore, even though the image quality of displayed video is not so satisfactory, most users tolerate such image quality and keep using the video equipment as it is.

SUMMARY OF THE INVENTION

Therefore, an object of the present invention is to provide a video stream processing apparatus and a video stream processing method for displaying videos consistently with high quality without requiring users to perform burdensome operations.

The present invention has the following features to attain the object mentioned above.

A video stream processing apparatus according to a first aspect of the present invention includes: an image-quality control information storage section for storing image-quality control information predetermined for each type of a video stream; an image-quality control information adding section for reading the image-quality control information corresponding to a type of an input video stream from the image quality control information storage section and adding the read image-quality control information to the video stream; and a recording section for recording the video stream with the image-quality control information added thereto.

The video stream processing apparatus may further include a storage medium control section for causing the image-quality control information stored in the image-quality control information storage section to be stored in a removable storage medium. Alternatively, the image-quality control information adding section may add a plurality of pieces of image-quality control information to the input video stream.

Also, the video stream processing apparatus may further include: an image-quality control information extracting section for extracting the image-quality control information from the video stream read from the recording section; a decoding section for obtaining a video signal based on the video stream after the image-quality control information is extracted; and an image quality adjusting section for adjusting a characteristic of the video signal based on the image-quality control information extracted by the image-quality control information extracting section.

In this case, the video stream processing apparatus may output the video signal with the characteristic being adjusted by the image quality adjusting section to a display unit externally connected to the video stream processing apparatus. Also, the video stream processing apparatus may further include a display section for displaying a screen based on the video signal with the characteristic being adjusted by the image quality adjusting section. Furthermore, the image-quality control information adding section may add a plurality of pieces of image-quality control information to the input video stream, and the image quality adjusting section may adjust the characteristic of the video signal based on one piece of image-quality control information selected from the plurality of pieces of image-quality control information extracted by the image-quality control information extracting section.

A video stream processing apparatus according to a second aspect of the present invention includes: an image-quality control information extracting section for extracting image-quality control information from an input video stream; a decoding section for obtaining a video signal based on the video stream after the image-quality control information is extracted; and an image quality adjusting section for adjusting a characteristic of the video signal based on the image-quality control information extracted by the image-quality control information extracting section.

The video stream processing apparatus may output the video signal with the characteristic being adjusted by the image quality adjusting section to a display unit externally connected to the video stream processing apparatus. Alternatively, the video stream processing apparatus may further include a display section for displaying a screen based on the video signal with the characteristic being adjusted by the image quality adjusting section. Still alternatively, the input video stream may have a plurality of pieces of image-quality control information added thereto, and the image quality adjusting section may adjust the characteristic of the video signal based on one piece of image-quality control information selected from the plurality of pieces of image-quality control information extracted by the image-quality control information extracting section.

A video stream processing method according to a third aspect of the present invention includes the steps of: storing image-quality control information predetermined for each type of a video stream; reading the image-quality control information corresponding to a type of an input video stream and adding the read image-quality control information to the video stream; and recording the video stream with the image-quality control information added thereto.

The video stream processing method may further include the steps of: extracting the image-quality control information from the recorded video stream; obtaining a video signal based on the video stream after the image-quality control information is extracted; and adjusting a characteristic of the video signal based on the extracted image-quality control information.

A video stream processing method according to a fourth aspect of the present invention includes the steps of: extracting image-quality control information from the recorded video stream; obtaining a video signal based on the video stream after the image-quality control information is extracted; and adjusting a characteristic of the video signal based on the extracted image-quality control information.

According to the video stream processing apparatus and the video stream processing method of the present invention, by automatically adjusting the image quality with the use of the image-quality control information added to the video stream, a video can be displayed consistently with high quality without requiring the user to perform burdensome operations even when the video equipment or the video type is changed. Particularly, by adding the image-quality control information corresponding to the type of the input video stream, the image quality can be effectively adjusted with a simple scheme.

Also, when a recording medium control section for causing the image-quality control information to be stored in the removable storage medium is provided, the image-quality control information can be externally set with arbitrary values. Also, a storage medium in which the image-quality control information has been written by one video stream processing apparatus is inserted to another video stream processing apparatus, thereby achieving the same image quality of the video reproduced among the plurality of video stream processing apparatuses.

Furthermore, a plurality of pieces of image-quality control information are added to the video stream, thereby allowing the user to select the image quality of the video to be reproduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustration showing an example of a video profile in the video stream processing apparatus according to the first embodiment of the present invention;

DESCRIPTION OF THE PREFERRED EMBODIMENTS

First Embodiment

Figure 1:
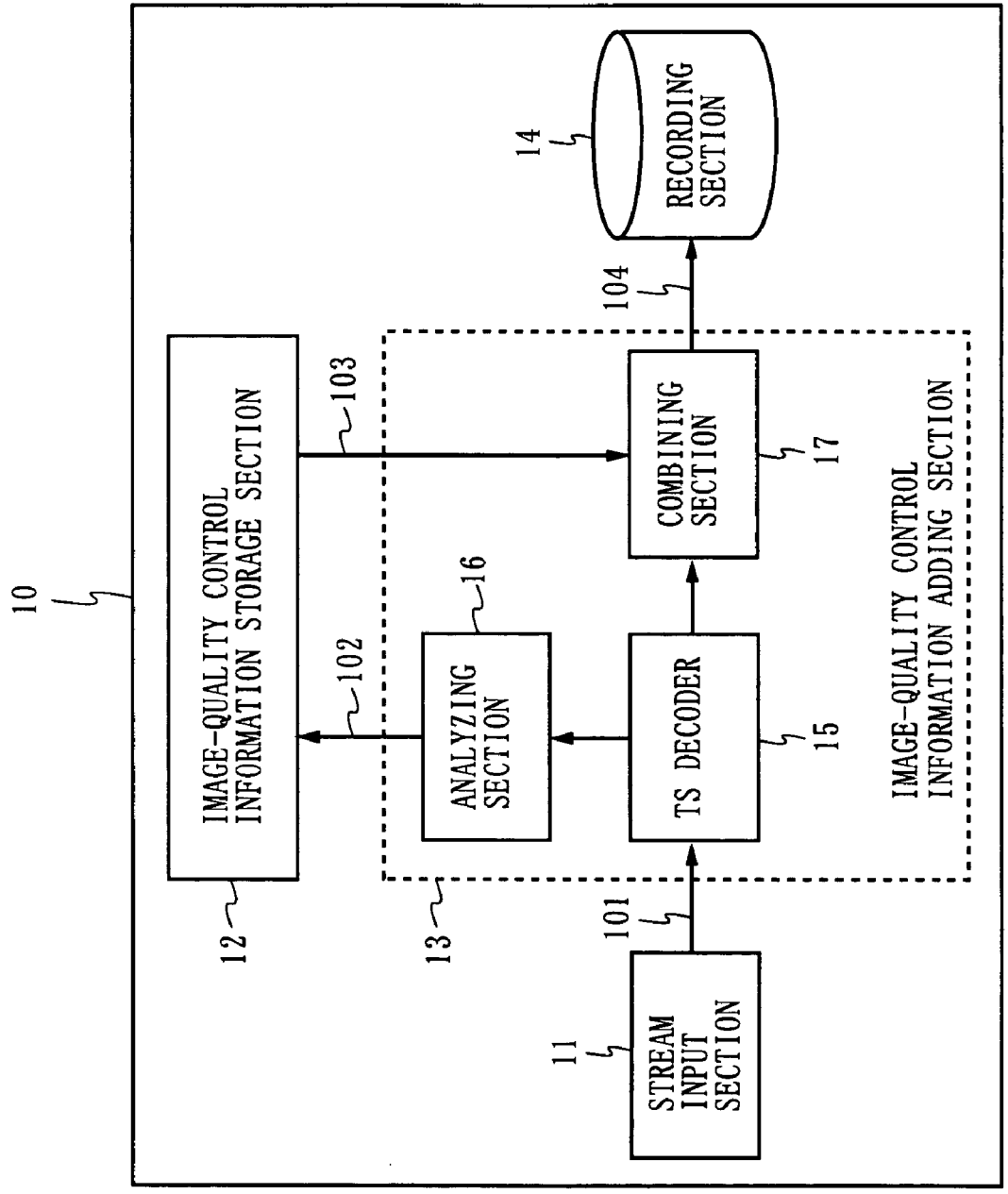
FIG. 1 is a block diagram showing the structure of a video stream processing apparatus according to a first embodiment of the present invention.

FIG. 1 is a block diagram showing the structure of a video stream processing apparatus according to a first embodiment of the present invention. A video stream processing apparatus 10 shown in FIG. 1 includes a stream input section 11, an image-quality control information storage section 12, an image-quality control information adding section 13, and a recording section 14. The video stream processing apparatus 10 is a video recording apparatus which adds a video profile 103 to an input video stream 101 and then records a video stream 104 with the video profile added thereto.

In FIG. 1, the stream input section 11 is an input section for inputting the video stream 101 as being encoded. Typically, the video stream 101 is inputted to the video stream processing apparatus 10 together with an audio stream, a control stream, etc. For example, as the video stream 101, a transport stream complying with MPEG (Moving Pictures Experts Group) is inputted.

The stream input section 11 can have an arbitrary structure as long as it has a function of inputting the video stream 101. For example, the stream input section 11 may include a tuner for processing signals received at an antenna, and a channel selector. In this case, from among the signals received at the antenna, the tuner selects a signal in a frequency band specified by the user and then demodulates the selected signal. Then, from the demodulated signal, the channel selector selects the video stream 101 of a channel specified by the user. In an alternative structure, the stream input section 11 may include an interface circuit complying with IEEE 1394, for example, in order to input the encoded video stream 101 coming outside of the video stream processing apparatus 10. Still alternatively, the stream input section 11 may be structured of a hard disk drive having stored therein the encoded video stream 101. The video stream 101 input from the stream input section 11 is supplied to the image-quality control information adding section 13.

The image-quality control information storage section 12 stores image-quality control information predetermined for each type of the video stream 101. FIG. 2 is an illustration showing an example of data stored in the image-quality control information storage section 12. As shown in FIG. 2, the image-quality control information storage section 12 stores a profile number, a video type, tag information, video control parameters, audio control parameters, and control data. Of these, the video control parameters correspond to image-quality control information. Hereinafter, a set of video control parameters, audio control parameters, and control data for one line shown in FIG. 2 is referred to as a video profile. Here, the video profile according to the present embodiment includes the audio control parameters and the control data. However, it would generally suffice for the video profile to include at least the image-quality control information (the video control parameters in FIG. 2).

In FIG. 2, the profile number is a number for identifying a video profile. The video type represents a type of the video associated with the video profile. Examples of the video type include movie, animation, and graphics. The tag information is a character string associated with the video profile for allowing a user to distinguish the video profiles. The tag information is, for example, displayed typically on a display unit (not shown) of the video stream processing apparatus so as to allow the user of the video stream processing apparatus to select a video profile.

The video profile includes various parameters for controlling the quality of the video based on the video stream 101 and the quality of audio output simultaneously at the time of video reproduction. The video profile shown in FIG. 2 contains the video control parameters including gamma value, maximum luminance, contrast, and color conversion, the audio control parameters including volume, sound, bass, 5.1 channel extension (denoted in FIG. 2 as 5.1 ch), and an equalizer, and the control data including a language description. By using these video control parameters, the video quality can be controlled according to the video type. Also, by using the audio control parameters, a sound field can be changed according to the video type. For example, audio control can be easily performed such that the bass is suppressed when the video type is news and the volume is turned down when the video type is teletext.

In FIG. 2, a color conversion equation CTi included in an i-th (i is a natural number, which is also applied to the following description) video profile is a color conversion equation applied to each pixel forming the video. Also, an equalizer EQi included in the i-th video profile represents an audio output adjustment level in a plurality of frequency bands. In more detail, the equalizer represents an amount, expressed in decibels, of cutting or boosting the audio signal in frequency bands (for example, 80 Hz, 150 Hz, 250 Hz, 1 kHz, 2.5 kHz, 5 kHz, and 10 kHz). Furthermore, a language description LDi included in the i-th video profile is a language description typically using XML (extensible Markup Language) or BML (Broadcast Markup Language) for controlling the video control parameters and the audio control parameters. Note that the video profiles shown in FIG. 2 are merely examples, and it would suffice that each video profile includes at least one parameter for controlling the image quality of the video based on the video stream 101.

A video profile is set in the image-quality control information storage section 12 in any of the following exemplary manners. That is, a video profile stored in advance in the ROM or the RAM in the video stream processing apparatus 10 may be set in the image-quality control information storage section 12. Alternatively, a video profile input by the user may be set in the image-quality control information storage section 12. In this case, the user may input a video profile through a graphical user interface of the video stream processing apparatus 10 or by entering a code number through a bar-code input unit.

Still alternatively, a video profile recorded on a hard disk drive, a DVD, or a memory card provided to the video stream processing apparatus 10 may be set in the image-quality control information storage section 12. Still alternatively, a video profile superposed on the video stream 101 or a video profile supplied together with the video stream 101 as another stream may be set in the image-quality control information storage section 12. Still alternatively, when the video stream 101 is supplied from an external recording medium such as a DVD, a video profile recorded on an area of the external recording medium, the area not having the video stream 101 recorded thereon, may be set in the image-quality control information storage section 12.

The image-quality control information adding section 13 adds a video profile 103 to the input video stream 101 as information for controlling the image quality of the video based on the video stream 101. In more detail, the image-quality control information adding section 13 reads the video profile 103 corresponding to the type of the video stream 101 from the image-quality control information storage section 12, and then writes the read video profile 103 in a predetermined data area of the video stream 101. For example, when the video profiles shown in FIG. 2 are stored in the image-quality control information storage section 12 and the type of the video stream 101 is "movie", the image-quality control information adding section 13 reads a video profile including a video type of "movie" (a gamma value of 1.05, a maximum luminance of 200, a contrast of 200, color conversion to be performed with a first color conversion equation, and a volume of 80%; other parameters are omitted), and then writes the read video profile in the predetermined data area of the video stream 110. Note that the data area in which the video profile 103 is to be written may or may not be defined by the standard of the video stream 110. When the data area is not defined by the standard of the video stream, the video profile 103 is written typically in an auxiliary data area (generally called a reserve area) defined by the standard of the video stream. Furthermore, in writing the parameters included in the video profile 103 in the video stream 101, the writing format and the order of the parameters to be written may be arbitrary.

For example, when the input video stream 101 is a transport stream received by a digital television broadcast receiver, a control stream included in the video stream 101 includes program information, and the program information further includes genre information indicative of a video type. In this case, the image-quality control information adding section 13 includes, as shown in FIG. 1, a transport stream decoder (hereinafter, a TS decoder) 15, an analyzing section 16, and a combining section 17. The TS decoder 15 extracts the control stream included in the input video stream 101. The analyzing section 16 analyzes the control stream extracted by the TS decoder 15 to extract the genre information included in the program information from the control stream. The extracted genre information is treated as information representing a type of the video stream 101 (hereinafter, a video type 102). The image-quality control information storage section 12 outputs the video profile 103 corresponding to the video type 102 (here, the genre information) extracted by the analyzing section 16. The combining section 17 combines the video profile 103 output from the image-quality control information storage section 12 with the video stream output from the TS decoder 15. From the image-quality control information adding section 13, the video stream with the video profile 103 added thereto is output.

Figure 3A:
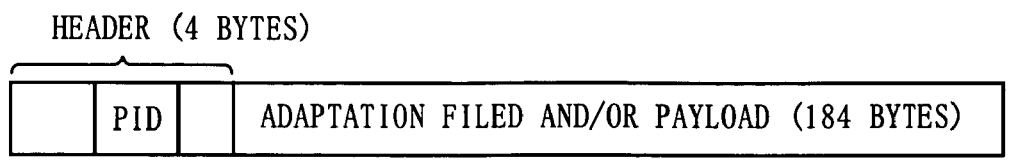
FIG. 3A is an illustration showing a transport packet input to the video stream processing apparatus according to the first embodiment of the present invention.

The image-quality control information adding section 13 may add the video profile 103 to any portion of the input video stream 101 as long as such addition does not affect reproduction of the video stream. For example, when the input video stream 101 is a MPEG2 transport stream, the video profile 103 can be embedded in the video stream 101 in any one of the manners shown in FIGS. 3B through 3E. In general, the MPEG2 transport stream is entered in a format as being divided into a plurality of transport packets (hereinafter, TS packets). One TS packet includes, as shown in FIG. 3A, a header of four bytes and a data portion of 184 bytes. The data portion includes either one or both of an adaptation field and a payload.

Figure 3B:
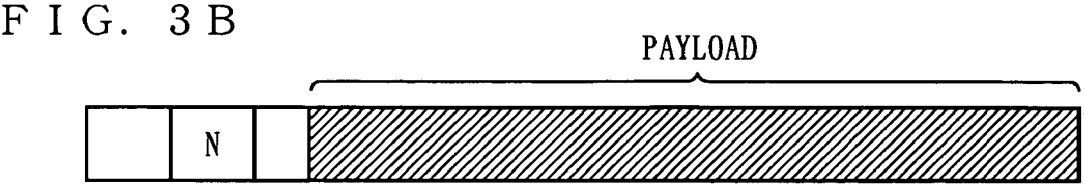
FIGS. 3B through 3E are illustrations each showing a transport packet to which a video profile is added by the video stream processing apparatus according to the first embodiment of the present invention.

When the video stream 101 in the above-described format is entered, in a first scheme, the video profile may be embedded in a private stream (refer to FIG. 3B). In the first scheme, a packet ID of N not for use in the video stream processing apparatus 10 is selected, and then a transport packet containing a packet ID of N and a payload which includes a video profile (represented by a hatched portion) is added to the input video stream 101.

Figure 3C:
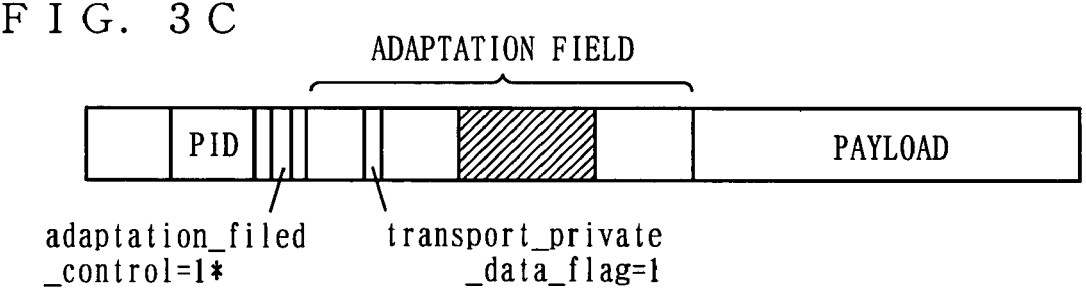

Alternatively, in a second scheme, the video profile may be embedded in the adaptation field in the TS packet (refer to FIG. 3C). In the second scheme, adaptation_field_control included in the header of the TS packet is set as 10 or 11 (in binary notation), and transport_private_data_flag included in the adaptation filed is set as 1. With that, the video profile (represented by a hatched portion) is disposed in the adaptation field.

Figure 3D:
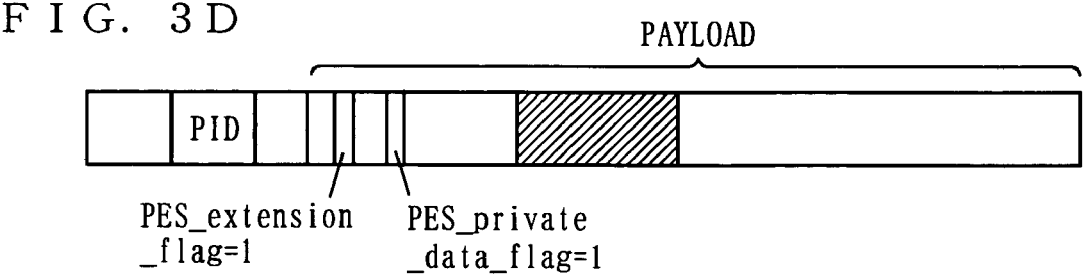

Still alternatively, in a third scheme, the video profile may be embedded in the header of a PES packet (refer to FIG. 3D). In the third scheme, both of PES_extension_flag and PES_private_data_flag included in the header of the PES packet are set as 1. With that, the video profile (represented by a hatched portion) divided by a predetermined length (specifically, 28 bytes) is disposed in the header of the PES packet.

Figure 3E:
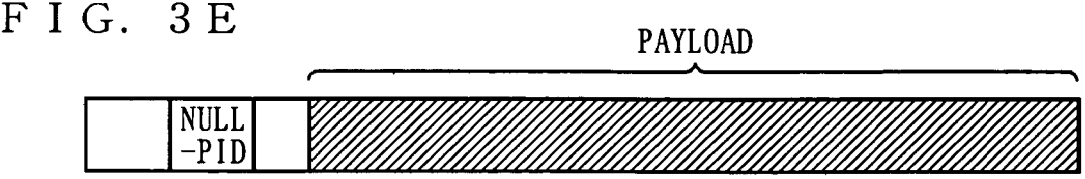

Still alternatively, in a fourth scheme, the video profile may be embedded in a NULL packet (refer to FIG. 3E). An MPEG2 transport stream includes a NULL packet which does not contain valid data in order to adjust a data rate. In the fourth scheme, the video profile (represented by a hatched portion) is disposed at a position where invalid data is disposed in the NULL packet.

Here, in some cases, the image-quality control information storage section 12 may have stored therein a plurality of video profiles for a certain video type. In the example shown in FIG. 2, the image-quality control information storage section 12 has stored therein two video profiles for the video type of drama. In this case, the image-quality control information adding section 13 may add these video profiles corresponding to the video type to the video stream. Alternatively, the image-quality control information adding section 13 may select only one of these video profiles that is to be added, correspondingly to the video type. In this case, the user may designate in advance a video profile to be selected by default. Alternatively, the user may designate a video profile to be selected at the time of recording the video stream.

The recording section 14 records the video stream 104, which is, with the video profile 103 added thereto, output from the image-quality control information adding section 13. The recording section 14 is implemented by a hard disk drive, for example.

Figure 4:
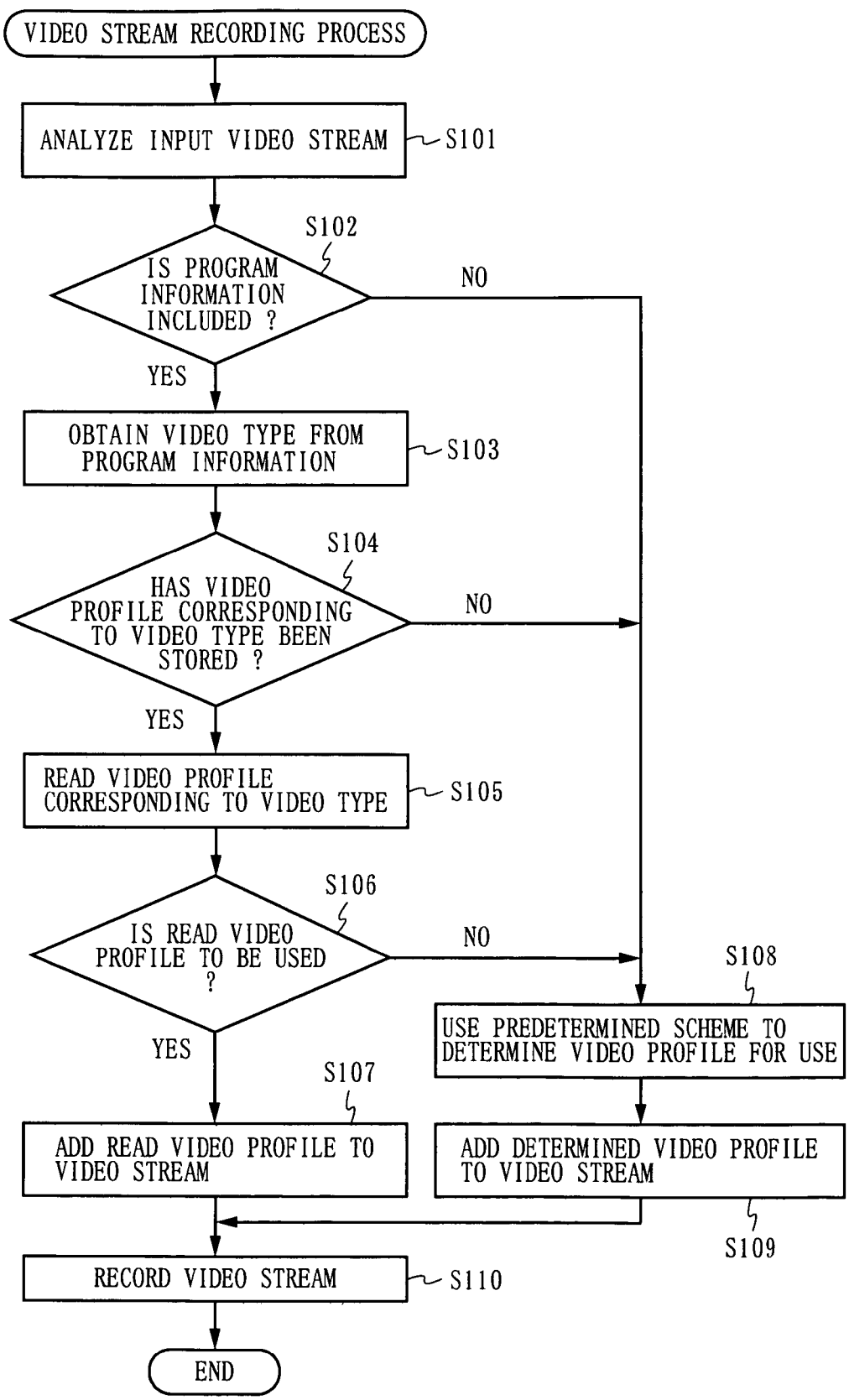
FIG. 4 is a flowchart showing a video stream recording process in the video stream processing apparatus according to the first embodiment of the present invention.

FIG. 4 is a flowchart showing a video stream recording process in the video stream processing apparatus according to the first embodiment of the present invention. The process shown in FIG. 4 is started upon input of the encoded video stream 101 from the stream input section 11. In the process shown in FIG. 4, the image-quality control information adding section 13 first analyzes the input video stream (step S101) to determine whether the input video stream includes program information (step S102).

If the input video stream includes program information (Yes in step S102), the image-quality control information adding section 13 obtains a video type (for example, any one of movie, animation, graphics, etc.) from the program information included in the video stream 101 (step S103), and then determines whether the image-quality control information storage section 12 has stored therein a video profile corresponding to the obtained video type (step S104).

If the image-quality control information storage section 12 has stored therein a video profile corresponding to the video type (Yes in step S104), the image-quality control information adding section 13 reads the video profile corresponding to the video type from the image-quality control information storage section 12 (step S105), and then determines whether the read video profile is to be used (step S106). The determination to be made in this step S106 by the image-quality control information adding section 13 is in accordance with, for example, an input command entered by the user using a command input section (not shown).

If the read video profile is to be used (Yes in step S106), the image-quality control information adding section 13 goes to step S107. In this case, the image-quality control information adding section 13 adds the video profile read in step S105 to the input video stream 101 (step S107).

On the other hand, if it is determined as No in any one of steps S102, S104, and S106, the image-quality control information adding section 13 goes to step S108. In this case, the image-quality control information adding section 13 uses a predetermined scheme to determine a video profile to be used (step S108). For example, in step S108, the image-quality control information adding section 13 determines a video profile predetermined by default or a video profile selected by the user using the command input section (not shown) as the video profile to be used. Next, the image-quality control information adding section 13 adds the video profile determined in step S108 to the input video stream 101 (step S109).

After step S107 or S109 is performed, the recording section 14 records the video stream with the video profile added by the image-quality control information adding section 13 (step S110). With that, the video stream recording process of the video stream processing apparatus 10 is completed.

Note that the video stream processing apparatus 10 may be supplied with a video stream already with a video profile added thereto. In this case, the video stream processing apparatus 10 may replace the previously-added video profile by a newly-found video profile. Alternatively, the video stream processing apparatus 10 may switchably use either one of the previously-added video profile or the newly-found video profile based on a designation from the user.

As described above, the video stream processing apparatus according to the present embodiment adds image-quality control information (a video profile in the above description) to an input video stream, and then records the video stream with the image-quality control information added thereto. The recorded video stream is input to another video stream processing apparatus for video reproduction. This other video stream processing apparatus extracts the image-quality control information from the input video stream and, by using the extracted information, adjusts the image quality of the video based on the video stream. As such, by automatically adjusting the image quality with the use of the image-quality control information added to the video stream, a video can be displayed consistently with high quality without requiring the user to perform burdensome operations even when the video equipment or the video type is changed.

Also, to the input video stream, the video stream processing apparatus according to the present embodiment adds image-quality control information corresponding to the type of the video stream. In more detail, this apparatus having stored therein a predetermined piece of image-quality control information for each type of the video stream reads one of the pieces of image-quality control information that corresponds to the type of the input video stream and then adds the read information to the video stream. As such, by using the image-quality control information corresponding to the type of the video stream for image quality control, the image quality can be effectively adjusted with a simple scheme.

Second Embodiment

Figure 5:
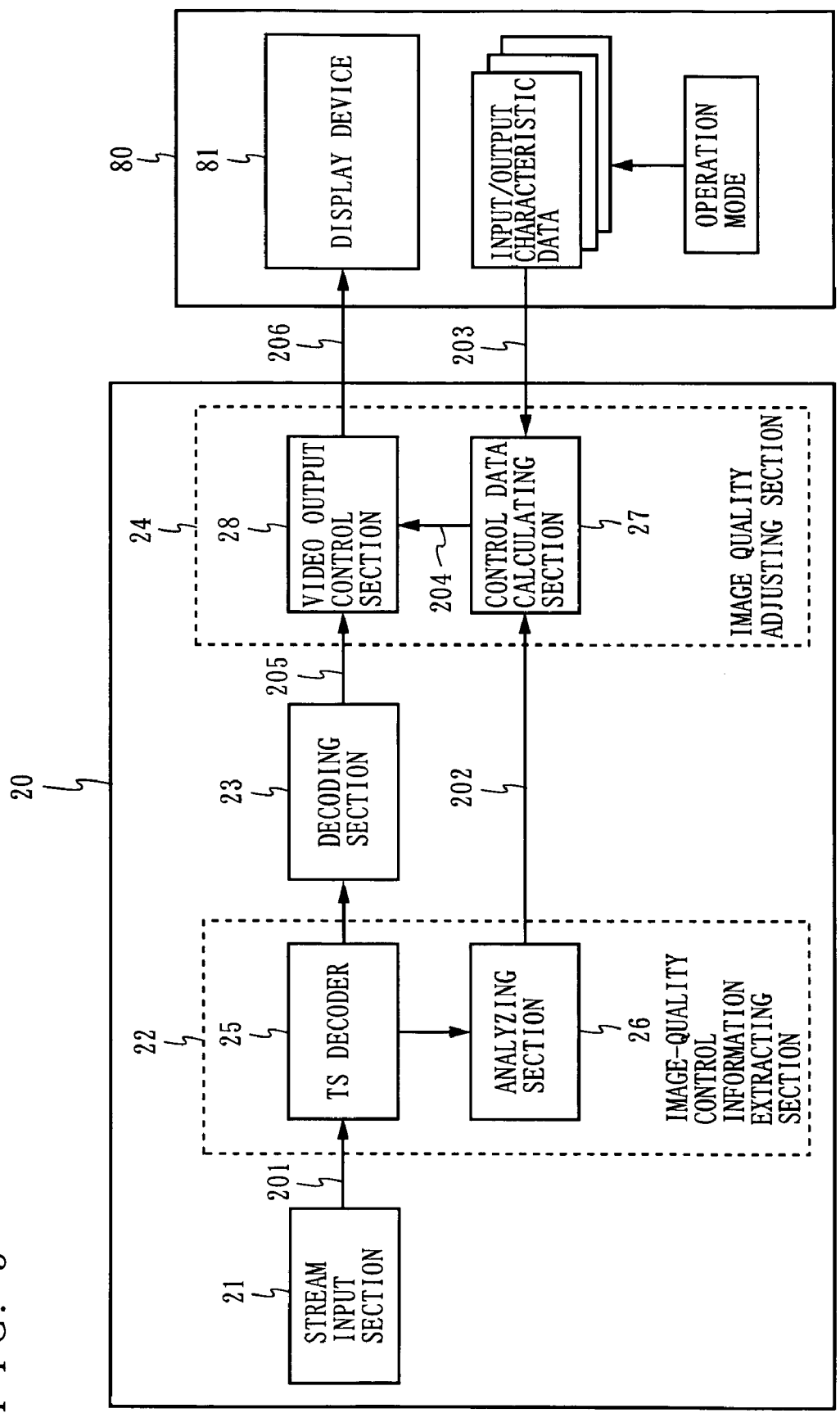
FIG. 5 is a block diagram showing the structure of a video stream processing apparatus according to a second embodiment of the present invention.

FIG. 5 is a block diagram showing the structure of a video stream processing apparatus according to a second embodiment of the present invention. A video stream processing apparatus 20 shown in FIG. 5 includes a stream input section 21, an image-quality control information extracting section 22, a decoding section 23, and an image quality adjusting section 24. The video stream processing apparatus 20 is a video reproducing apparatus which extracts a video profile 202 from an input video stream 201 and, by using this extracted video profile 202, adjusts the image quality of a video signal 205 reproduced. The video stream processing apparatus 20 is connected to an externally-provided display unit 80 by using a predetermined interface. The video reproduced by the video stream processing apparatus 20 is displayed on the display unit 80.

In FIG. 5, as with the first embodiment, the stream input section 21 is an input section for inputting the encoded video stream 201. However, the input video stream 201 supplied from the stream input section 21 has a video profile already being added as the image-quality control information typically by the video stream processing apparatus 10 according to the first embodiment. The stream input section 21 may have an arbitrary structure as long as it has a function of inputting the video stream 201. As with the first embodiment, the stream input section 21 includes, for example, a combination of a tuner and a channel selector, an interface circuit complying with IEEE 1394, or a hard disk drive.

The image-quality control information extracting section 22 extracts an added video profile 202 from the input video stream 201 input from the stream input section 21. In more detail, the image-quality control information extracting section 22 extracts the video profile 202 from a predetermined data area of the video stream 201 input from the stream input section 21. The extracted video profile 202 is supplied to the image quality adjusting section 24. The video stream having the video profile 202 extracted therefrom is supplied to the decoding section 23.

The image-quality control information extracting section 22 includes, as shown in FIG. 5, a TS decoder 25 and an analyzing section 26. The TS decoder 25 extracts a control stream included in the input video stream 201. The analyzing section 26 analyzes the control stream extracted by the TS decoder 25 to extract the video profile 202 from the control stream.

The decoding section 23 obtains a video signal 205 and an audio signal (not shown) based on the video stream having the video profile extracted therefrom. The decoding section 23 includes, for example, an MPEG2 video decoder and an MPEG2 audio decoder.

Based on the video profile 202 extracted by the image-quality control information extracting section 22, the image quality adjusting section 24 adjusts the characteristic of the video signal 205 obtained by the decoding section 23, and then outputs a video signal 206 after image quality adjustment. At this time, the image quality adjusting section 24 reads input/output characteristic data 203 stored in the display unit 80, and then performs image quality adjustment with reference to the read input/output characteristic data. It is assumed herein that the display unit 80 has such input/output characteristic data for each operation mode, and that the image quality adjusting section 24 reads the input/output characteristic data 203 corresponding to the operation mode of the display unit 80.

The image quality adjusting section 24 includes, as shown in FIG. 5, a control data calculating section 27 and a video output control section 28. The control data calculating section 27 calculates control data required for the video output control section 28 to adjust the characteristic of the video signal. This calculation is based on the video profile 202 extracted by the image-quality control information extracting section 22 and the input/output characteristic data 203 read from the display unit 80. The video output control section 28 adjusts the characteristic of the video signal 205 obtained by the decoding section 23. This adjustment is based on the control data calculated by the control data calculating section 27. In this manner, from the image quality adjusting section 24, the video signal 206 after image quality adjustment is output.

When the input video stream 201 includes a plurality of video profiles and the image-quality control information extracting section 22 extracts a plurality of video profiles 202, the image quality adjusting section 24 selects one of those extracted video profiles 202 and, based on the selected video profile, adjusts the characteristic of the video signal 205 obtained by the decoding section 23.

The video stream processing apparatus 20 and the display unit 80 are connected to each other via a bi-directional interface which allows transmission of the video signal from the video stream processing apparatus 20 to the display unit 80 and transmission of the control data vice versa. For such a connection, HDMI (High-Definition Multimedia Interface), which is an interface standard of next-generation HDTVs, can be used, for example. For connection between the video stream processing apparatus 20 and the display unit 80, arbitrary wired or wireless communication can be used as long as it allows transmission of required data.

The video signal after image quality adjustment is output to the display unit 80 connected to the video stream processing apparatus 20. The display unit 80 includes a display device 81 for displaying a video based on the input video signal. With this the video based on the video signal 206 after image quality adjustment is displayed on the display device 81 of the display unit 80.

Figure 6:
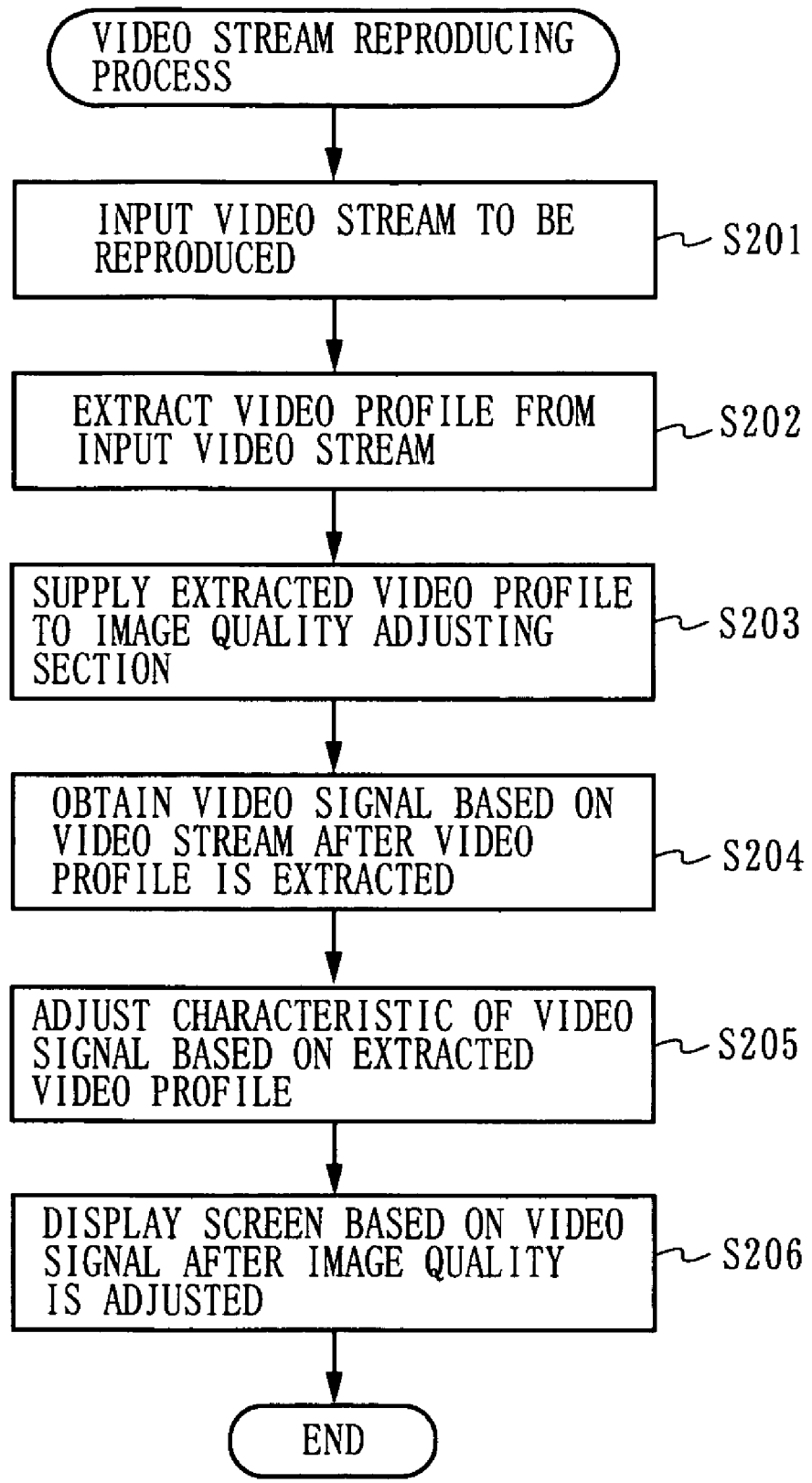
FIG. 6 is a flowchart showing a video stream reproducing process in the video stream processing apparatus according to the second embodiment of the present invention.

FIG. 6 is a flowchart showing a video stream reproducing process in the video stream processing apparatus 20. The process shown in FIG. 6 is started when, for example, the user issues an instruction by using a command input section (not shown) for reproducing a video stream. In the process shown in FIG. 6, a video stream 201 to be reproduced is first input from the stream input section 21 (step S201). Next, the image-quality control information extracting section 22 extracts a video profile 202 added to the input video stream 201 (step S202), and then supplies the extracted video profile 202 to the image quality adjusting section 24 (step S203).

Next, the decoding section 23 obtains a video signal 205 based on the video stream after the video profile 202 is extracted in step S202 (step S204). Next, based on the video profile supplied in step S203, the image quality adjusting section 24 adjusts the characteristic of the video signal 205 obtained in step S204, and then outputs a video signal 206 after image quality adjustment (step S205). Upon receiving the video signal 206 after image quality adjustment from the video stream processing apparatus 20, the display unit 80 displays a video based on the video signal 206 after image quality adjustment (step S206). With that, the video stream reproducing process of the video stream processing apparatus 20 is completed.

Figure 7:
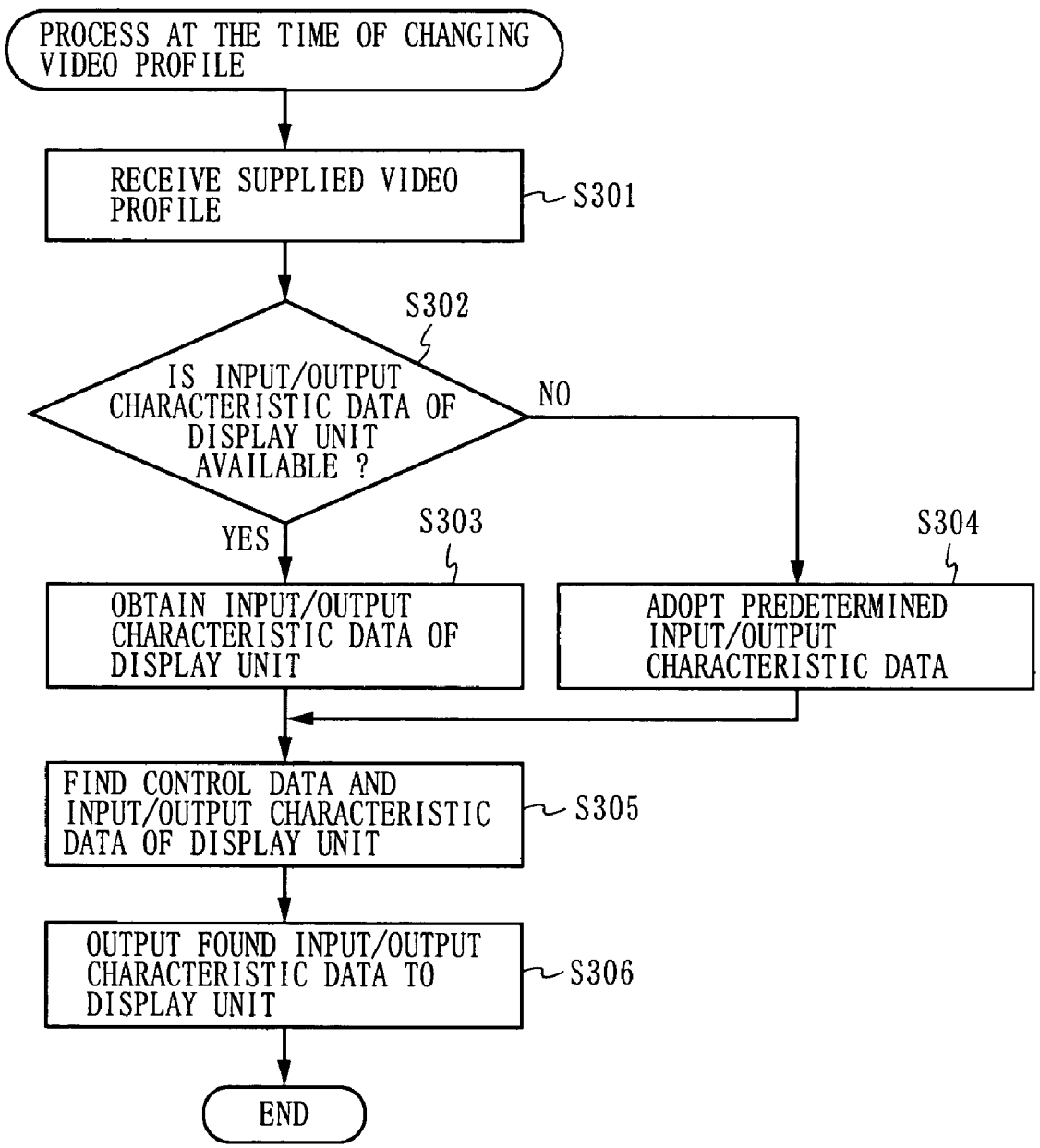
FIG. 7 is a flowchart showing a process in the video stream processing apparatus according to the second embodiment of the present invention when a video profile is changed.

FIG. 7 is a flowchart showing a process in the video stream processing apparatus 20 when a video profile is changed. The process shown in FIG. 7 is performed when a new video profile 202 is supplied from the image-quality control information extracting section 22 to the image quality adjusting section 24. In the process shown in FIG. 7, the image quality adjusting section 24 first receives the supplied video profile 202 (step S301).

Next, the image quality adjusting section 24 determines whether the input/output characteristic data of the display unit 80 stored therein is available (step S302). If the input/output characteristic data of the display unit 80 is available (Yes in step S302), the image quality adjusting section 24 obtains the input/output characteristic data of the display unit 80 (step S303) for use in the following processes. Otherwise (No in step S302), the image quality adjusting section 24 adopts input/output characteristic data predetermined for the display unit 80 (step S304) for use in the following processes.

Next, based on the video profile 202 received in step S301 and the input/output characteristic data 203 of the display unit 80 obtained in step S303 (or the input/output characteristic data adopted instep S304), the image quality adjusting section 24 finds control data and input/output characteristic data of the display unit 80 required for image quality control at the image quality adjusting section 24 (step S305). Next, the image quality adjusting section 24 outputs the input/output characteristic data of the display unit 80 found in step S305 to the display unit 80 (step S306). With that, the process in the video stream processing apparatus 20 when the video profile is changed is completed.

After the process shown in FIG. 7 is completed, the image quality adjusting section 24 adjusts the characteristic of the video signal 205 obtained in the decoding section 23 in accordance with the control data found in step S305. Also, in accordance with the input/output characteristic data found in step S305, the display unit 80 adjusts the characteristic of the video signal 206 after image quality adjustment, and then displays a video based on the video signal 206 after image quality adjustment.

As described above, the video stream processing apparatus according to the present embodiment extracts the image-quality control information (the video profile in the above description) from the input video stream and, by using the extracted information, adjusts the characteristic of the video based on the video stream. As such, by automatically adjusting the image quality with the use of the image-quality control information added to the video stream, a video can be displayed consistently with high quality without requiring the user to perform burdensome operations even when the video equipment or the video type is changed.

Also, the video stream processing apparatus according to the present embodiment is supplied with a video stream with image-quality control information corresponding to the type of the video stream added thereto. Therefore, by controlling the image quality with the use of the image-quality control information corresponding to the type of the video stream, the image quality can be effectively adjusted with a simple scheme.

Figure 8:
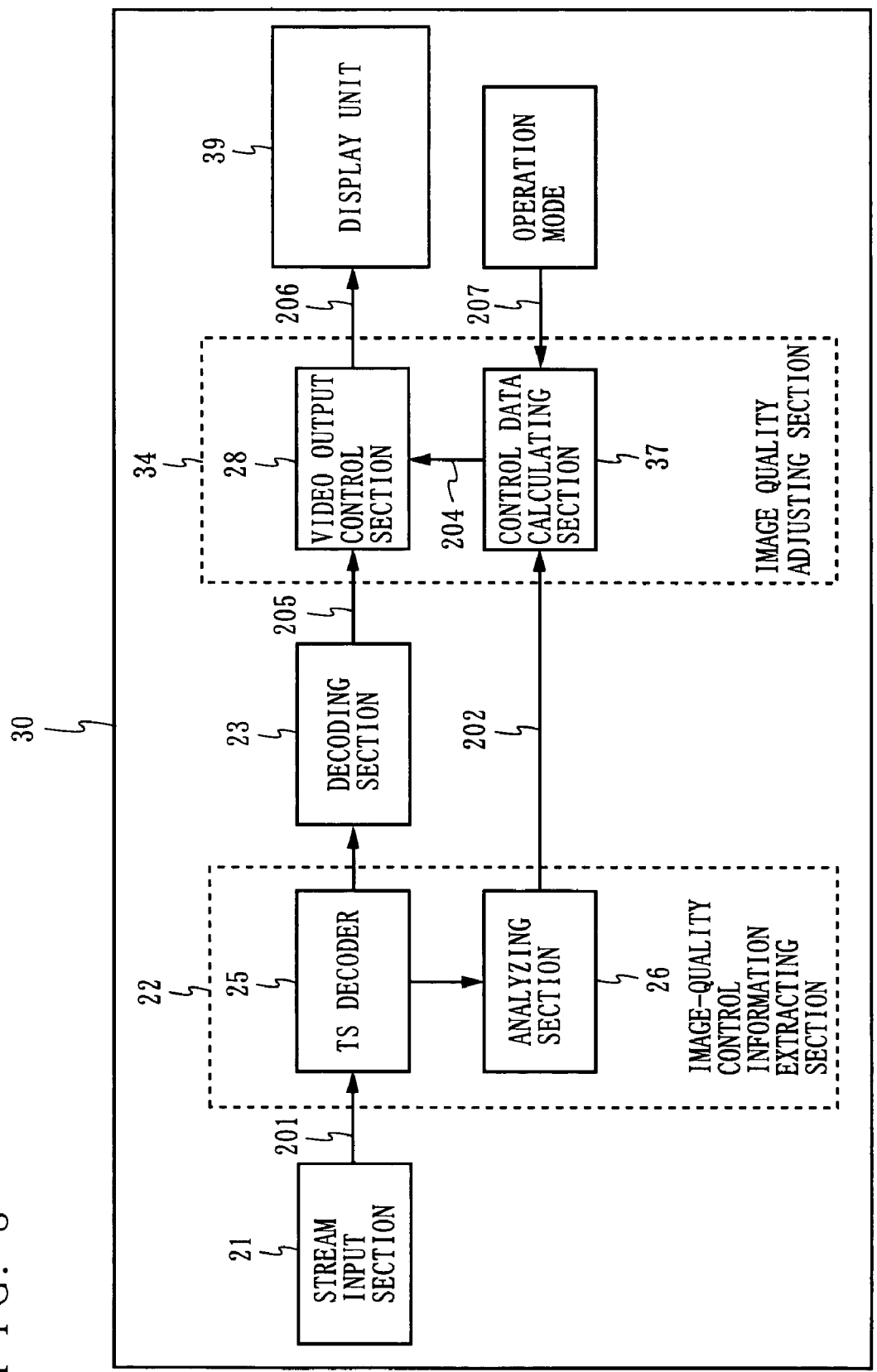
FIG. 8 is a block diagram showing the structure of a video stream processing apparatus according to an exemplary embodiment of the second embodiment of the present invention.

The video stream processing apparatus according to the present embodiment can be exemplarily modified as follows. For example, as shown in FIG. 8, the video stream processing apparatus may include, in addition to the section for obtaining the video signal, a display section for displaying a screen based on the obtained video signal. A video stream processing apparatus 30 shown in FIG. 8 has a structure similar to that of the video stream processing apparatus 20 shown in FIG. 5 except that the image quality adjusting section 24 is replaced by an image quality adjusting section 34 and a display section 39 is newly added. The image quality adjusting section 34 has a similar structure to that of the image quality adjusting section 24 except that the control data calculating section 27 is replaced by a control data calculating section 37. The control data calculating section 37 has stored therein input/output characteristic data of the display section 39 for each operation mode. Based on the video profile 202 extracted by the image-quality control information extracting section 22 and an operation mode 207 of the display section 39, the control data calculating section 37 calculates control data required for the video output control section 28 to adjust the image quality. The video stream processing apparatus 30 shown in FIG. 8 achieves the same effects as those achieved by the video stream processing apparatus 20 shown in FIG. 5.

In the video stream processing apparatus 20 shown in FIG. 5, the interface, such as HDMI, is used to obtain the input/output characteristic data 203 of the display unit 80. Alternatively, the input/output characteristic data of the display unit 80 may be obtained through another scheme. For example, in the video stream processing apparatus, the input/output characteristic data of the display unit 80 maybe read from a storage medium, such as a DVD, or may be downloaded from a server connected thereto via a communication line.

Also, in the video stream reproducing process shown in FIG. 6, the video profile extracted in step S202 is automatically used. Instead, it may be determined whether to use the video profile extracted in step S202 and, if it is determined that not to use it, a video profile corresponding to the video type designated by the user may be used.

Third Embodiment

Figure 9:
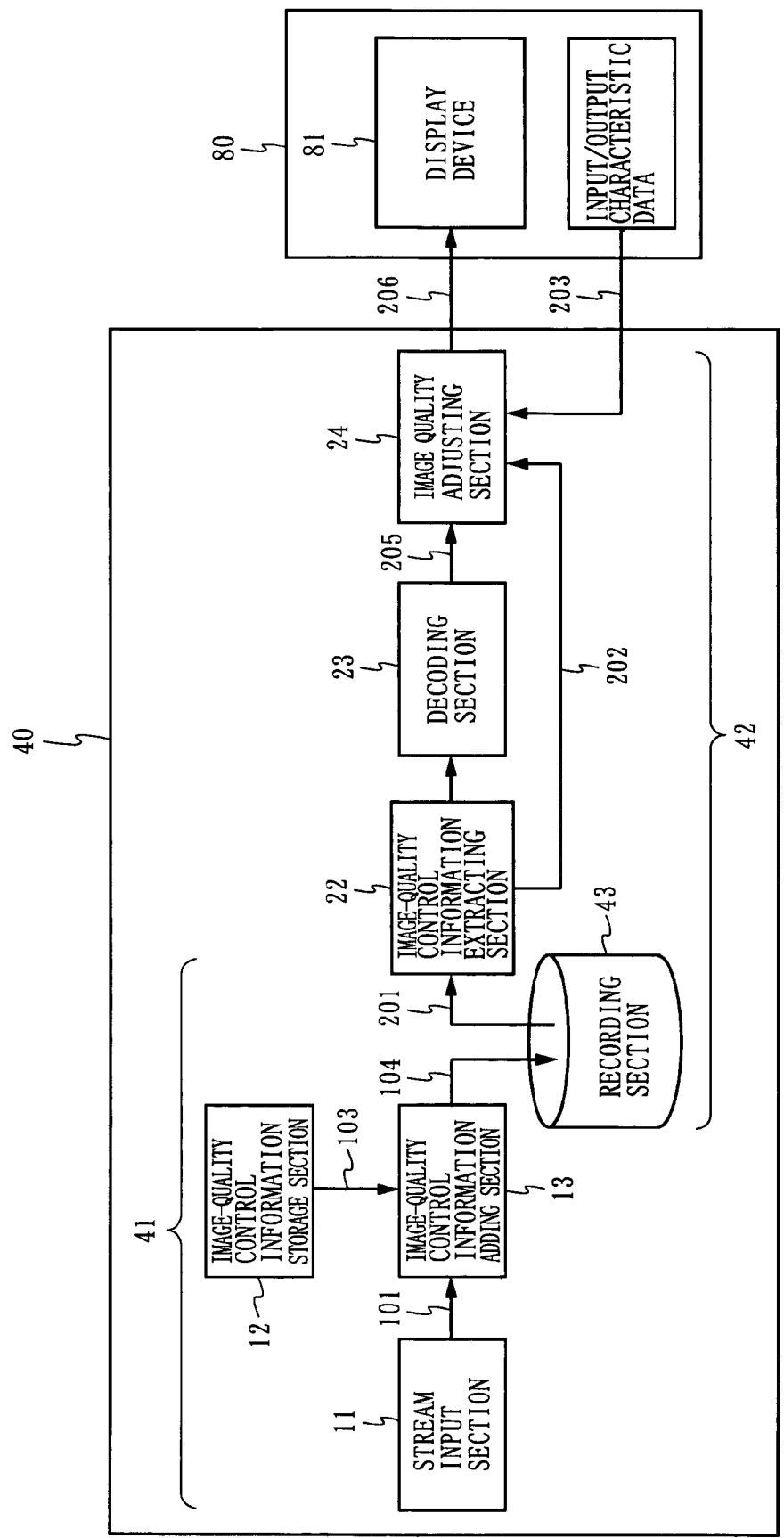
FIG. 9 is a block diagram showing the structure of a video stream processing apparatus according to a third embodiment of the present invention.

FIG. 9 is a block diagram showing the structure of a video stream processing apparatus according to a third embodiment of the present invention. A video stream processing apparatus 40 shown in FIG. 9 includes the stream input section 11, the image-quality control information storage section 12, the image-quality control information adding section 13, a recording section 43, the image-quality control information extracting section 22, the decoding section 23, and the image quality adjusting section 24. The video stream processing apparatus 40 shown in FIG. 9 is formed by integrating the video stream processing apparatus 10 according to the first embodiment (FIG. 1) and the video stream processing apparatus 20 according to the second embodiment (FIG. 5). Therefore, the video stream processing apparatus 40 functions as a video recording/reproducing apparatus. In the present embodiment, components similar to those of the first and second embodiments are provided with the same reference numerals, and are not described herein.

Of the components shown in FIG. 9, the stream input section 11, the image-quality control information storage section 12, the image-quality control information adding section 13, and the recording section 43 form a video stream recording section 41. Also, the recording section 43, the image-quality control information extracting section 22, the decoding section 23, and the image quality adjusting section 24 form a video stream reproducing section 42. In this structure, the recording section 43 functions as a recording section of the video stream recording section 41 and also as a stream input section of the video stream reproducing section 42.

The video stream recording section 41 and the video stream reproducing section 42 operate in a manner similar to the video stream processing apparatuses 10 and 20, respectively, according to the first and second embodiments. In more detail, the video stream recording section 41 adds the video profile 103 to the video stream 101 input from the stream input section 11. The video stream 104 with the video profile 103 added thereto is recorded in the recording section 43. The video stream reproducing section 42 extracts the video profile 202 from the video stream 201 read from the recording section 43 and, by using the extracted video profile, adjusts the image quality of the video signal 205 obtained by decoding the video stream 201. The video signal 206 after image quality adjustment is output to the display unit 80 connected to the video stream processing apparatus 40. The display unit 80 then displays on its screen a video based on the video signal 206 after image quality adjustment.

Therefore, according to the video stream processing apparatus according to the present embodiment, the input video stream is recoded as having image-quality control information (a video profile in the above description) added thereto and, by using the added image-quality control information, the characteristic of the video based on the video stream is adjusted. As such, by automatically adjusting the image quality with the use of the image-quality control information added to the video stream, a video can be displayed consistently with high quality without requiring the user to perform burdensome operations even when the video equipment or the video type is changed.

Figure 10:
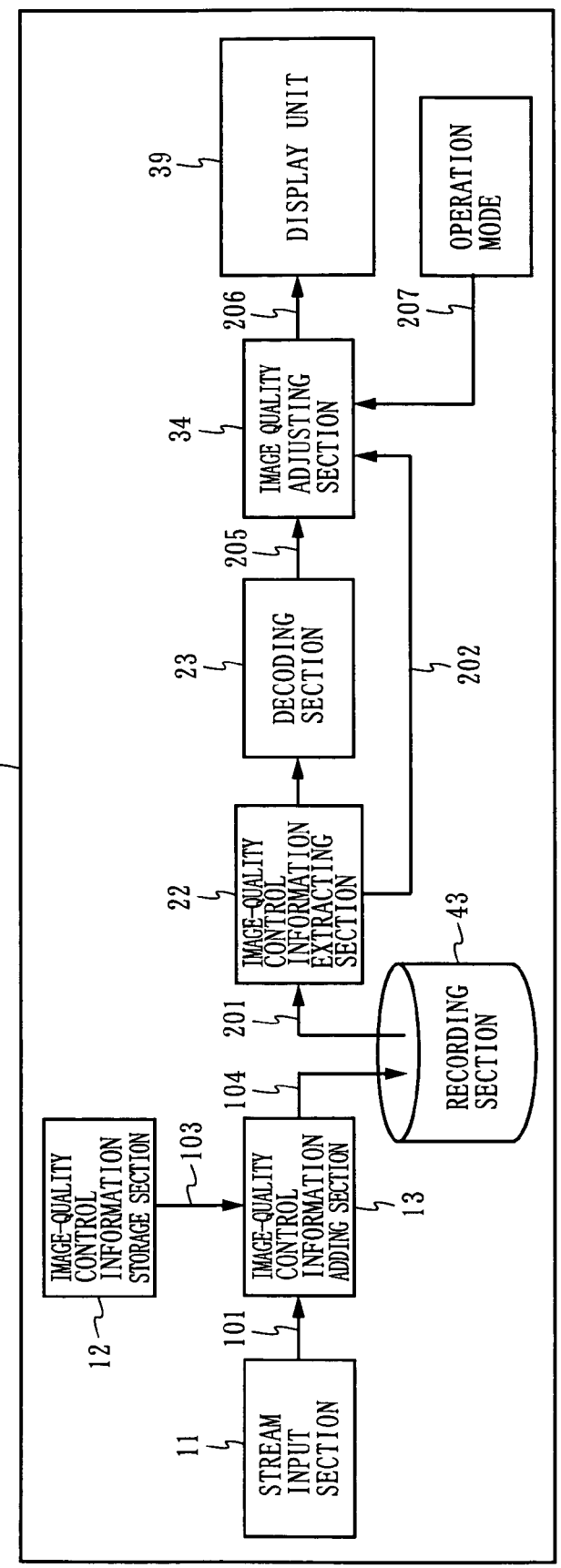
FIG. 10 is a block diagram showing the structure of a first exemplary modification of the third embodiment of the present invention.

The video stream processing apparatus according to the present embodiment can be exemplarily modified as follows. For example, as shown in FIG. 10, the video stream processing apparatus may include, in addition to the section for obtaining the video signal, a display section for displaying a screen based on the obtained video signal. A video stream processing apparatus 50 shown in FIG. 10 has a structure similar to that of the video stream processing apparatus 40 shown in FIG. 9 except that the image quality adjusting section 24 is replaced by the image quality adjusting section 34 and the display section 39 is newly added. The image quality adjusting section 34 and the display section 39 included in the video stream processing apparatus 50 are identical to those shown in FIG. 8, and therefore are not described herein. The video stream processing apparatus 50 shown in FIG. 10 achieves the same effects as those achieved by the video stream processing apparatus 40 shown in FIG. 9.

Figure 11:
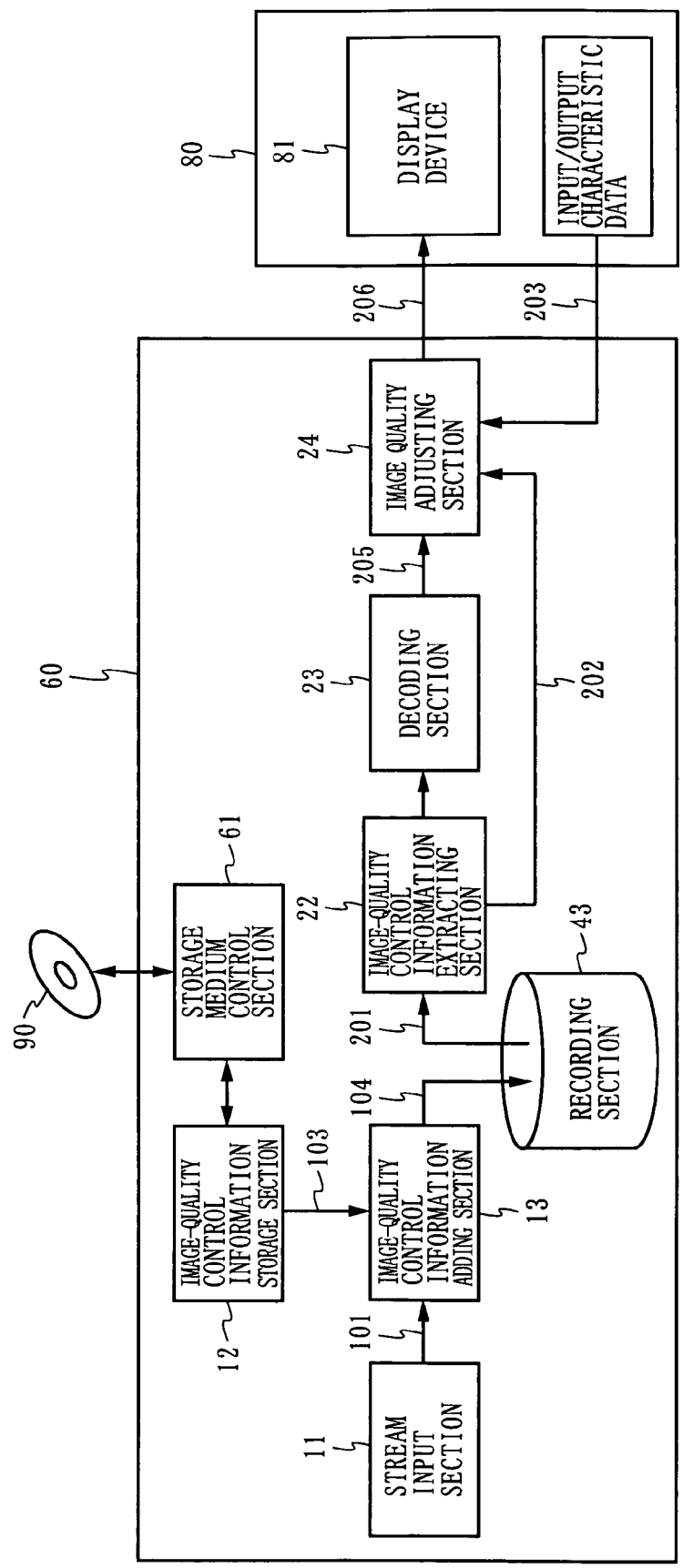
FIG. 11 is a block diagram showing the structure of a second exemplary modification of the third embodiment of the present invention.

Also, as shown in FIG. 11, the video stream processing apparatus may include a recording medium control section which causes data to be stored in a removable storage medium. A video stream processing apparatus 60 shown in FIG. 11 includes a storage medium control section 61 which causes the video profile stored in the image-quality control information storage section 12 to be stored in a removable storage medium 90. As the storage medium 90, a memory card or a flexible disk is used, for example. According to the video stream processing apparatus 60 shown in FIG. 11, the video profile can be externally set with arbitrary values. Also, a storage medium in which the video profile has been written by one video stream processing apparatus is inserted to another video stream processing apparatus, thereby achieving the same image quality of the video reproduced among the plurality of video stream processing apparatuses.

Figure 12:
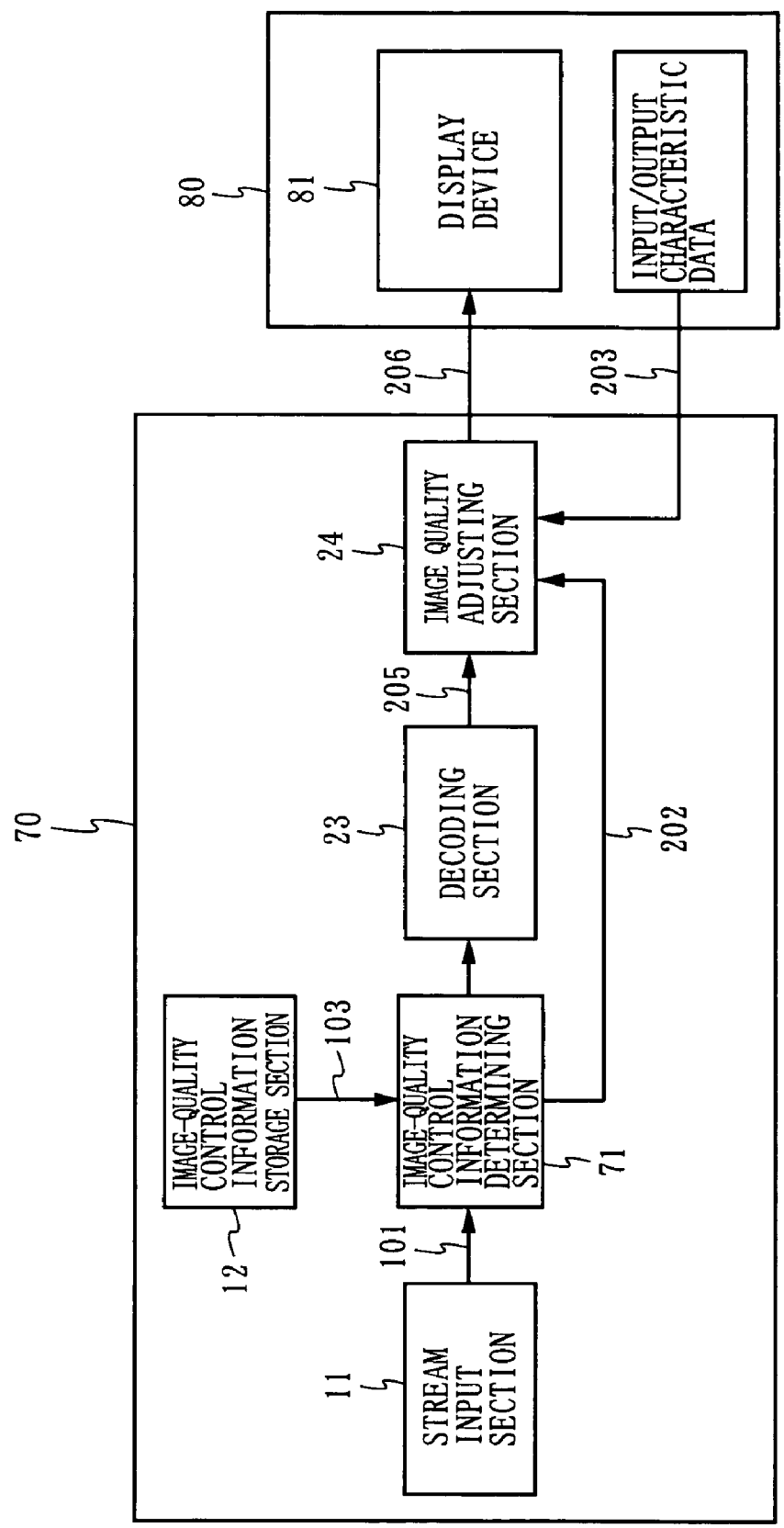
FIG. 12 is a block diagram showing the structure of a third exemplary modification of the third embodiment of the present invention.

Furthermore, as shown in FIG. 12, the video stream processing apparatus may not include a recording section for recording a video stream. A video stream processing apparatus 70 shown in FIG. 12 has a structure similar to that of the video stream processing apparatus 40 shown in FIG. 9 except that the recording section 43 is deleted and the image-quality control information adding section 13 and the image-quality control information extracting section 22 are replaced by an image-quality control information determining section 71. The image-quality control information determining section 71 reads the video profile 103 corresponding to the type of the input video stream 101, and then outputs the read video profile 103 as the video profile 202 to the image quality adjusting section 24. As such, in the video stream processing apparatus 70, the input video stream 101 is reproduced without being recorded, and the image quality is controlled by using the video profile 103 corresponding to the type of the video stream 101.

As described above, the video stream processing apparatuses according to the first through third embodiments are apparatuses which perform a predetermined process on the video stream. For example, the video stream processing apparatus according to the first embodiment is used as a video stream processing apparatus to be installed in a television broadcasting station, while the video stream processing apparatus according to the second embodiment is used as a television receiver. In this case, the video stream with the image-quality control information added thereto is created at the television broadcasting station. The television receiver receives the video stream with the image-quality control information added thereto and, by using the added image-quality control information, controls the image quality of the video based on the video stream. This makes it possible to cause the video to be displayed on the television receiver with the image quality as intended by the video creator even without requiring the user to perform image quality adjustment.

Also, the video stream processing apparatus according to the third embodiment is used as a video recording/reproducing apparatus that receives and records a television broadcast. In this case, the video recording/reproducing apparatus receives a video stream including a video type and adds a video profile corresponding to the video type to the received video stream for recoding. For video reproduction, the video recording/reproducing apparatus extracts the video profile from the recorded video stream and, by using the extracted video profile, adjusts the image quality of the reproduced video. This makes it possible to set the image quality of the video reproduced by the video recording/ reproducing apparatus according to the intention of the video creator without requiring the user to perform image quality adjustment.

However, in the above two cases, if the user does not want the image quality as intended by the video creator, the user changes the settings of the television receiver or the video recording/reproducing apparatus so as to use a video profile suited for user's preferences.

All of the above-described video stream processing apparatuses can be achieved by a combination of a CPU and a program for performing the video stream processing method on the CPU. Also, needless to say, the video stream processing apparatus according to the first embodiment may include the storage medium control section 61 shown in FIG. 11.

The video stream processing apparatus according to the present invention allows a video to be displayed consistently with high quality even without requiring the user to perform burdensome operations. Therefore, the video stream processing apparatus can be used as a video recording apparatus, a video reproducing apparatus, and video recording/reproducing apparatus, such as a digital television receiver, a digital video recorder, and a personal computer having a video recording/reproducing function.

While the invention has been described in detail, the foregoing description is in all aspects illustrative and not restrictive. It is understood that numerous other modifications and variations can be devised without departing from the scope of the invention.

What is claimed is:

1. A video stream processing apparatus which performs a predetermined process on an encoded video signal stream, comprising:
    an image-quality control information storage section for storing image-quality control information predetermined for each type of a video stream;
    an image-quality control information adding section for reading the image-quality control information corresponding to a type of an input video stream from the image-quality control information storage section and adding the read image-quality control information to the video stream; and
    a recording section for recording the video stream with the image-quality control information added thereto.

2. The video stream processing apparatus according to claim 1, further comprising
    a storage medium control section for causing the image-quality control information stored in the image-quality control information storage section to be stored in a removable storage medium.

3. The video stream processing apparatus according to claim 1, wherein
    the image-quality control information adding section adds a plurality of pieces of said image-quality control information to the input video stream.

4. The video stream processing apparatus according to claim 1, further comprising:
    an image-quality control information extracting section for extracting the image-quality control information from the video stream read from the recording section;
    a decoding section for obtaining a video signal based on the video stream after the image-quality control information is extracted; and
    an image quality adjusting section for adjusting a characteristic of the video signal based on the image-quality control information extracted by the image-quality control information extracting section.

5. The video stream processing apparatus according to claim 4, wherein
    the video signal with the characteristic being adjusted by the image quality adjusting section is output to a display unit externally connected to the video stream processing apparatus.

6. The video stream processing apparatus according to claim 4, further comprising
    a display section for displaying a screen based on the video signal with the characteristic being adjusted by the image quality adjusting section.

7. The video stream processing apparatus according to claim 4, wherein
    the image-quality control information adding section adds a plurality of pieces of said image-quality control information to the input video stream, and
    the image quality adjusting section adjusts the characteristic of the video signal based on one piece of image-quality control information selected from the plurality of pieces of said image-quality control information extracted by the image-quality control information extracting section.

8. A video stream processing apparatus which performs a predetermined process on an encoded video signal stream, comprising:
    a video stream recording section for recording a video stream with image-quality control information, said video stream recording section including an image-quality control information storage section for storing the image-quality control information predetermined for each type of a video stream;
    an image-quality control information extracting section for extracting image-quality control information from an input video stream;
    a decoding section for obtaining a video signal based on the video stream after the image-quality control information is extracted; and
    an image quality adjusting section for adjusting a characteristic of the video signal based on the image-quality control information extracted by the image-quality control information extracting section.

9. The video stream processing apparatus according to claim 8, wherein
    the video signal with the characteristic being adjusted by the image quality adjusting section is output to a display unit externally connected to the video stream processing apparatus.

10. The video stream processing apparatus according to claim 8, further comprising
    a display section for displaying a screen based on the video signal with the characteristic being adjusted by the image quality adjusting section.

11. The video stream processing apparatus according to claim 8, wherein
    the input video stream has a plurality of pieces of said image-quality control information added thereto, and
    the image quality adjusting section adjusts the characteristic of the video signal based on one piece of image-quality control information selected from the plurality of pieces of said image-quality control information extracted by the image-quality control information extracting section.

12. A video stream processing method of performing a predetermined process on an encoded video signal stream, comprising the steps of:
    storing image-quality control information predetermined for each type of a video stream;

reading the image-quality control information corresponding to a type of an input video stream and adding the read image-quality control information to the video stream; and recording the video stream with the image-quality control information added thereto.

13. The video stream processing method according to claim 12, further comprising the steps of:

extracting the image-quality control information from the recorded video stream;

obtaining a video signal based on the video stream after the image-quality control information is extracted; and adjusting a characteristic of the video signal based on the extracted image-quality control information.

14. A video stream processing method of performing a predetermined process on an encoded video signal stream, comprising the steps of:

storing image-quality control information predetermined for each type of video stream and recording a video stream with the image-quality control information to for an input video stream; extracting image-quality information from the input video stream;

extracting image-quality control information from an input video stream;

obtaining a video signal based on the video stream after the image-quality control information is extracted; and adjusting a characteristic of the video signal based on the extracted image-quality control information.

15. A removable storage medium embodied with a computer program causing a computer to perform a predetermined process on an encoded video signal stream, the program comprising the steps of:

storing image-quality control information predetermined for each type of a video stream;

reading the image-quality control information corresponding to a type of an input video stream and adding the read image-quality control information to the video stream; and recording the video stream with the image-quality control information added thereto.

16. The removable storage medium embodied with a computer program according to claim 15, further comprising the steps of:

extracting the image-quality control information from the recorded video stream;

obtaining a video signal based on the video stream after the image-quality control information is extracted; and adjusting a characteristic of the video signal based on the extracted image-quality control information.

17. The removable storage medium embodied with a computer program causing a computer to perform a predetermined process on an encoded video signal stream, the program comprising the steps of: storing image-quality control information predetermined for each type of video stream and recording a video stream with the image-quality control information to for an input video stream; extracting image-quality information from the input video stream;

obtaining a video signal based on the video stream after the image-quality control information is extracted; and adjusting a characteristic of the video signal based on the extracted image-quality control information.

* * * * *